I. HARRISON.
ANTISKIDDING DEVICE.
APPLICATION FILED APR. 26, 1917.
1,250,866. Patented Dec. 18, 1917.
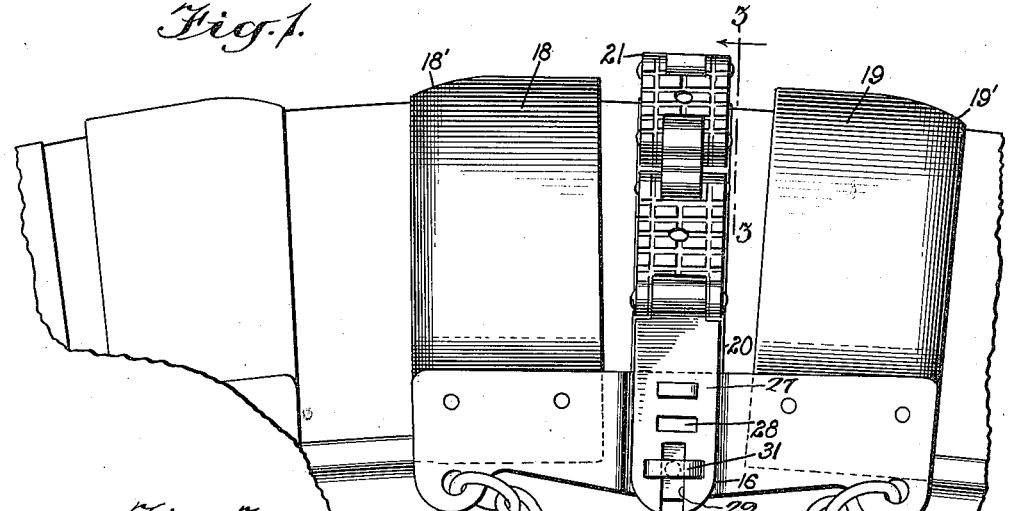
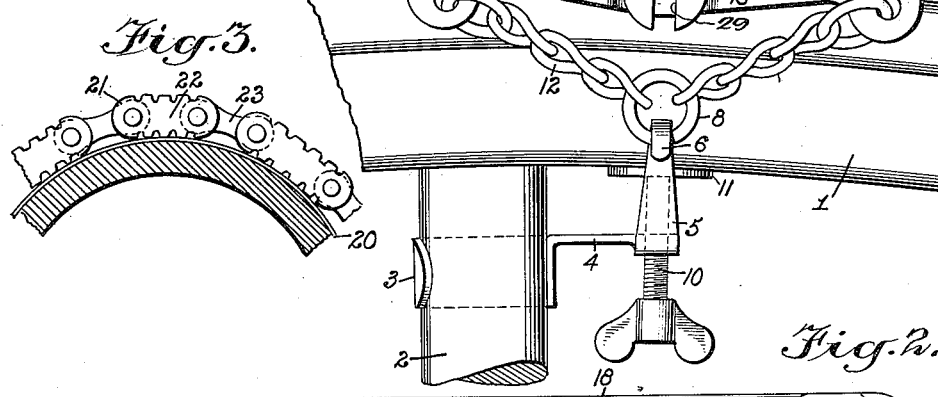
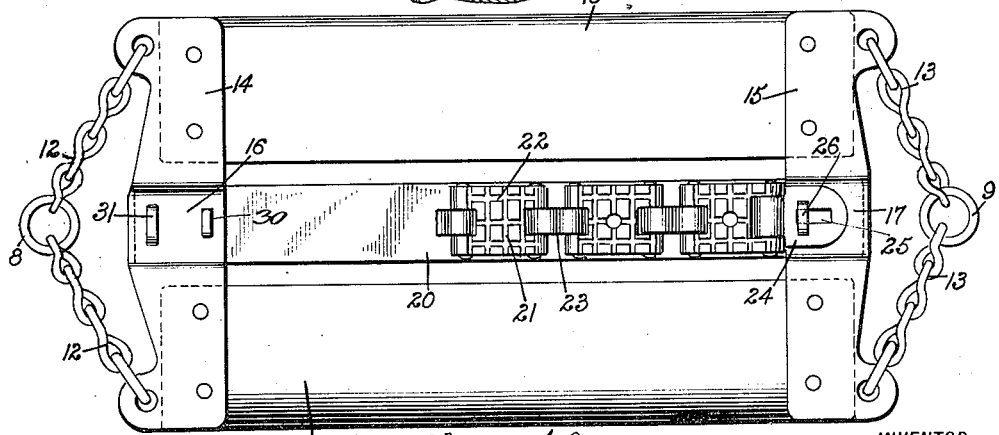
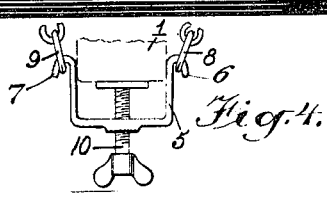
WITNESSES
INVENTOR
I. Harrison
BY
ATTORNEYS

UNITED STATES PATENT OFFICE.

ISAAC HARRISON, OF PITTSBURGH, PENNSYLVANIA.

ANTISKIDDING DEVICE.

1,250,866.        Specification of Letters Patent.     Patented Dec. 18, 1917.

Application filed April 26, 1917. Serial No. 164,726.

*To all whom it may concern:*

Be it known that I, ISAAC HARRISON, a citizen of the United States, and a resident of Pittsburgh, in the county of Allegheny and State of Pennsylvania, have invented a new and Improved Antiskidding Device, of which the following is a full, clear, and exact description.

This invention relates to protecting devices and anti-skidding devices for automobile tires, and has for an object the provision of an improved construction which may be quickly applied and removed.

Another object in view is to provide an anti-skidding device in connection with a protecting structure formed so that the anti-skidding member will not wear or in any way injure the tire.

A further object of the invention is to provide a device formed with a pair of spaced protecting members and a removable anti-skidding device arranged therebetween.

In the accompanying drawing:—

Figure 1 is a side view of part of a tire arranged on a wheel together with a device embodying the invention shown arranged in proper position thereon.

Fig. 2 is a top plan view of the protector and anti-skidding device in a spread-out position.

Fig. 3 is a detail fragmentary sectional view through Fig. 1 on line 3—3 illustrating the protection for the anti-skidding member.

Fig. 4 is a front elevation of the chain engaging clip embodying certain features of the invention, the same being on a reduced scale.

Referring to the accompanying drawing by numerals, 1 indicates a wheel of any desired kind provided with a spoke 2 partially encircled by a clip 3 formed with an arm or bracket 4 which merges into a U-shaped anchor 5, said anchor having hooks 6 and 7 formed thereon, as shown in Fig. 4, so as to receive the rings 8 and 9. A screw member 10 having preferably a comparatively large foot 11 passes through the anchor 5 and may be adjusted to produce substantially any desired tension on the rings 8 and 9 and the parts connected therewith so as to hold the entire structure firmly in place. The rings 8 and 9 are connected to the respective chains 12 and 13, which chains are in turn pivotally connected in ears formed on the plates 14 and 15, these plates being formed of metal and provided with depressions 16 and 17.

A pair of protecting strips 18 and 19 of canvas, leather or other material are secured to the plates 14 and 15 by rivets or other suitable means, the same being spaced apart as shown in Fig. 2, so that a metal strip 20 may be arranged therebetween, said strip being preferably resilient and preferably secured to the depressed portions 16 and 17 by rivets. By reason of the flexibility or resiliency of the strip 20 the same will conform substantially to the shape of the tire during use and will also act as a wearing plate for the anti-skidding chain member 21. The chain member 21 may be of a variety of forms without departing from the spirit of the invention but is preferably provided with a plurality of solid bearing links 22 and connecting links 23, links 23 being preferably flat on both surfaces though formed with roughened portions, whereby either side of the anti-skidding device 21 may be used.

At one end of the anti-skidding device 21 is pivotally mounted a plate 24 having a slot 25 designed to accommodate the retaining member 26, which retaining member is provided with a comparatively long head and a narrow body so that the plate 24 may be placed over the retaining member and then turned to the position shown in Fig. 2, whereupon it will be held against accidental removal. At the end opposite plate 24 a second plate 27 is provided which is pivotally connected to one of the links 22 and is preferably provided with a plurality of slots 28 and an enlarged notch or slot 29. The slots 28 are intended to accommodate an upstanding lug 30 rigidly secured to the plate 14, while the notch or slot 29 is intended to accommodate a pivotally mounted retaining member 31 which is pivotally mounted on plate 14 and is arranged parallel to slot 29 when the plate 27 is being placed in position, and is then turned to the position shown in Fig. 1. This will prevent the plate 29 from being removed from the plate 14 while the lug 30 will prevent any longitudinal movement of plate 27.

As above set forth and as shown in the drawing, the anti-skidding member 21 is made the same shape on both sides so that it may be turned over whenever desired in addition to being removed and a new one substituted therefor. In arranging the antiskidding device and protector in place on the wheel one or any number may be used as occasion may demand, preferably a comparatively few for ordinary anti-skidding or slipping of the wheels. In forming the protecting members 18 and 19 the edges thereof are preferably beveled at 18' and 19' whereby a more easy action is produced and bumping caused by these members eliminated.

What I claim is:

1. In a device of the character described, a pair of protecting strips formed of leather having beveled edges, a pair of plates, means for connecting said plates to the opposite ends of said protecting strips, means for holding said plates in position when the device is in use, and an anti-slipping device connected with said plates and arranged between said strips.

2. In a device of the character described, a pair of plates adapted to be arranged on each side of a tire when the device is in use, protecting members connected with said plates, a flexible member connected with said plates and arranged between said protecting members, said flexible member being formed of metal, a metallic reversible anti-slipping device arranged on said flexible member, and means for securing said anti-slipping device to said plates.

3. In a device of the character described, a pair of plates adapted to be arranged on each side of the tire when the device is in use, flexible protecting strips connecting said plates, said strips being spaced apart, a metallic flexible member connecting said plates and arranged between said strips, an articulated anti-slipping device arranged on said flexible member, and means for removably connecting said anti-slipping device to said plates.

4. A device of the character described, a pair of substantially flat plates adapted to be arranged on each side of a tire when used and extending longitudinally thereof, each of said plates having a depression centrally, a flexible metal strip connected at the opposite ends to said plates within said depressions, flexible protecting members connected to said plates near the ends thereof, said flexible protecting members being spaced apart a substantially equal distance from said flexible metal strip, a pair of up-standing studs arranged on each of said plates at the depressed portion, one of said studs being rotatable, said studs having enlarged comparatively flat heads, an anti-skidding chain formed with plates at the ends having apertures adapted to fit over said studs, the rotatable stud being adapted to be turned transversely of the aperture after the anti-skidding chain has been placed in position, whereby it is locked against accidental removal, and means for securing said plates in position.

ISAAC HARRISON.